United States Patent Office 3,305,891
Patented Feb. 28, 1967

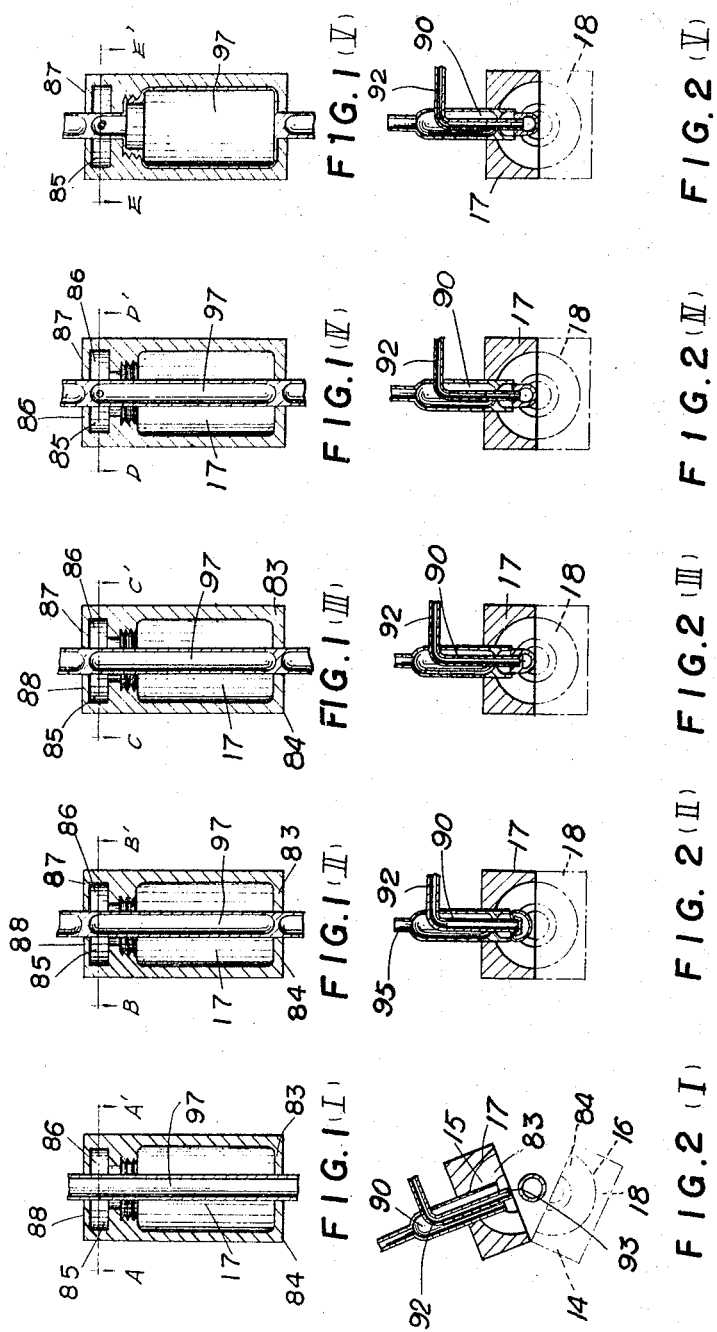

3,305,891
APPARATUS FOR MANUFACTURING HOLLOW ARTICLES FROM A SOFTENED TUBULAR BLANK OF RESINOUS MATERIAL
Kenichi Nozaki, 812 2-chome Yawata-machi, Ichikawa-shi, Chiba-ken, Japan
Filed Mar. 20, 1963, Ser. No. 266,718
Claims priority, application Japan, Mar. 31, 1962, 37/12,983, 37/12,984
5 Claims. (Cl. 18—5)

The present invention relates to a method and apparatus for manufacturing hollow articles from resinous material. More particularly this invention relates to a method and apparatus for moulding various articles continuously and at high efficiency by introducing compressed air into successive sections of a tubular blank of artificial resinous material.

Heretofore, two methods of continuously manufacturing such articles have been proposed. One method consists in enclosing or clamping a tubular blank of artificial resinous material in a mould such that the tubular blank is hermetically sealed at its opposite ends and then piercing said tubular blank with a hollow needle provided for said mould to introduce compressed air into said blank to provide a hollow moulded article. However, with such a method care should be taken to accurately operate a number of components of the apparatus to determine the position at which the hollow needle pierces the blank, the time interval during which the compressed air is introduced into the blank and the like operations. Accordingly the apparatus is very complicated and subjected to frequent faults. Moreover when the wall thickness of the blank is large, piercing of the wall of the blank by the hollow needle is difficult or causes the blank to shift in the mould, thus producing many rejects.

The other method consists in enclosing a blank in a mould to form a hollow cylinder with projecting fins or webs and applying compressed air through said fins or webs to obtain a hollow moulded product.

This method is not also applicable to blanks of heavy wall thickness and preparation of metal moulds requires skilled workmen as well as high cost. Further, by the pressure of the compressed air alone it is difficult to provide for the blank a bore of proper dimension and even when such bore could be provided there is a tendency to form cracks around said bore causing many rejects.

A machine has also been proposed for preparing hollow articles comprising a supporting frame, a horizontal shaft rotatably mounted on said frame, a boss securely mounted on the shaft, a plurality of saddles mounted on the periphery of said boss at equal spacings, a pair of mould shoes mounted on each of said saddles to be slidable in parallel with said shaft and means to move respective halves of the mould mounted on the shoe over the same distance to cause the mould halves of each pair to firmly engage with each other. This machine is also not only complicated, high priced, but also contains many sources of trouble. One of the important problems required to be carefully considered in these machines is the problem of time relation between introduction and exhaust of the compressed air but so far as the applicant is aware satisfactory results have not been achieved irrespective of the many efforts.

Therefore it is the principal object of this invention to provide an arrangement for mass producing hollow moulded articles of high quality from resinous material at a high speed with high accuracy.

A further object of this invention is to provide an improved apparatus for manufacturing hollow resinous articles which can eliminate various disadvantages of the prior machines pointed out hereinabove.

Still another object of this invention is to provide an improved moulding apparatus which can manufacture a series of hollow moulded articles in a chain form from a continuous tubular blank of resinous material.

Generally speaking, the present invention contemplates feeding a softened tubular blank in an opened split mould, closing said mould to clamp and hermetically enclose a section of said tubular blank, attracting a portion of the wall of said tubular blank by the action of air suction applied through a pipe opened in said mould so as to make thin or rupture said wall portion and thereafter introducing compressed air into said section of tubular blank through said thin or ruptured wall portion to expand or mould said section.

The foregoing concept is accomplished by means of an apparatus comprising a rotary disc, a plurality of split moulds mounted on the periphery of said rotary disc, means to sequentially open and close these split moulds, means to feed a softened tubular blank into an open blank, means to attract a portion of the wall of said tubular blank which is clamped by and enclosed in the closed mould so as to rupture this wall portion said means including a pair of inner and outer concentric tubes extending from the outside to the inside of the mould, the inner tube projecting beyond the inner end of the outer tube, and means to provide air suction to the outer tube and to introduce compressed air into said tubular blank through the inner tube so as to expand or mould the tubular blank into articles having the desired configuration. In this way a series of hollow moulded articles connected like a chain are successively formed from a continuously fed tubular blank. Opening and closing operations of the split moulds are controlled by rollers mounted on the mould and cooperating guide rails and supply of air suction as well as compressed air to the respective moulds are controlled by sliding valve means mounted on said shaft in a predetermined sequence.

Further objects and advantages of the present invention will become apparent and this invention will be better understood from the following description, reference being made to accompanying drawings. The subject matters which are regarded as this invention are particularly pointed out and distinctly claimed in the appended claims.

In the drawings,

FIGS. 1(I), 1(II), 1(III), 1(IV), and 1(V) illustrate successive steps by which a tubular material is formed into hollow articles of the required configuration;

FIGS. 2(I), 2(II), 2(III), 2(IV) and 2(V) show cross section, respectively, along lines A–A', B–B', C–C', D–D' and E–E' of FIGS. 1(I) to 1(V) inclusive;

In the embodiment herein shown the construction and operation of the apparatus are described with regard to the manufacture of a bottle, for example, and it should be understood that the terms left, right, upper and lower and the like all refer to the accompanying drawings.

Figure 4:
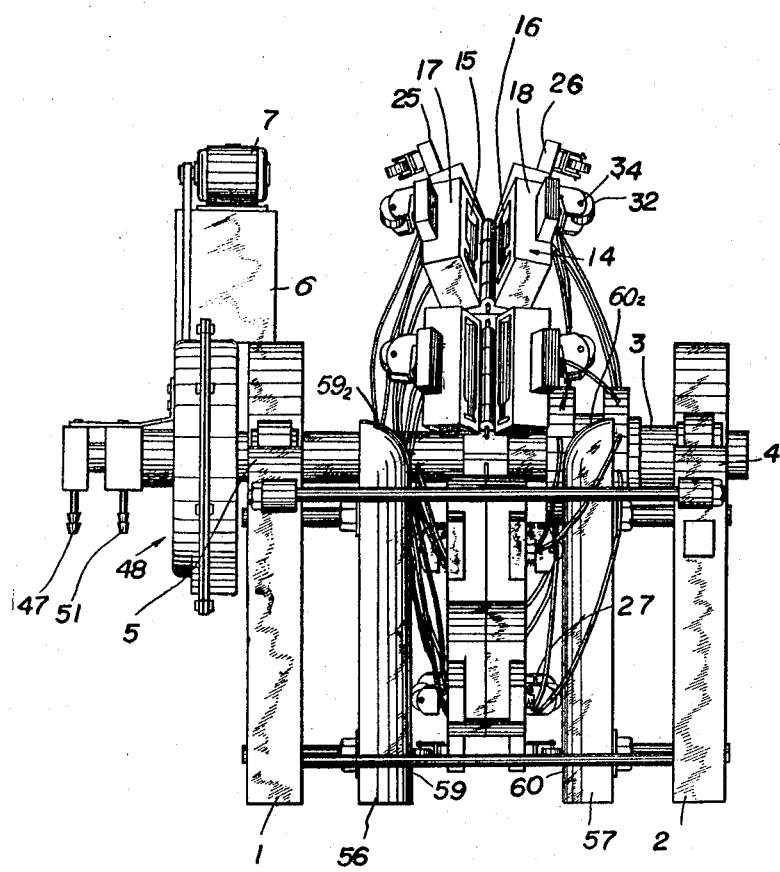
FIG. 4 is a front elevation thereof.
Figure 5:
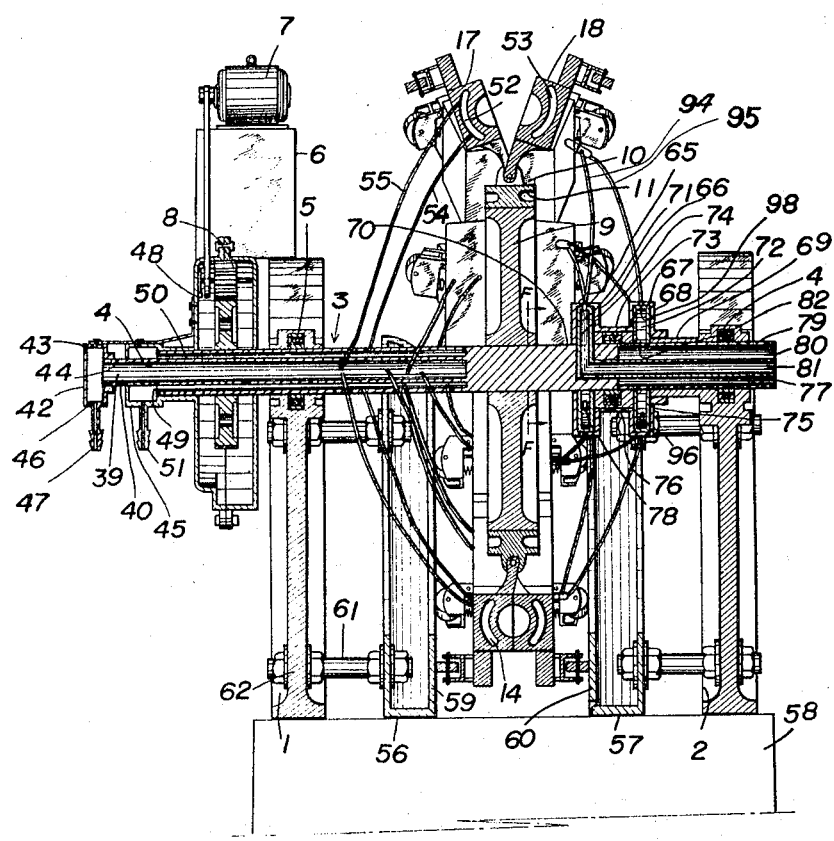
FIG. 5 is a longitudinal sectional view of the apparatus shown in FIGS. 3 and 4.

Referring now to FIGS. 4 and 5, the apparatus constructed in accordance with this invention comprises a pair of spaced opposed frames 1 and 2 having bearing metals 4 and 5 at their upper ends adapted to support a shaft 3. At one side and above the frame 1 is disposed a stationary vertical plate 6 to support a suitable source of motive power, such for instance, an electric motor 7 to drive the shaft 3 at a low speed through a suitable speed reducing mechanism 8 (FIG. 5).

Figure 3:
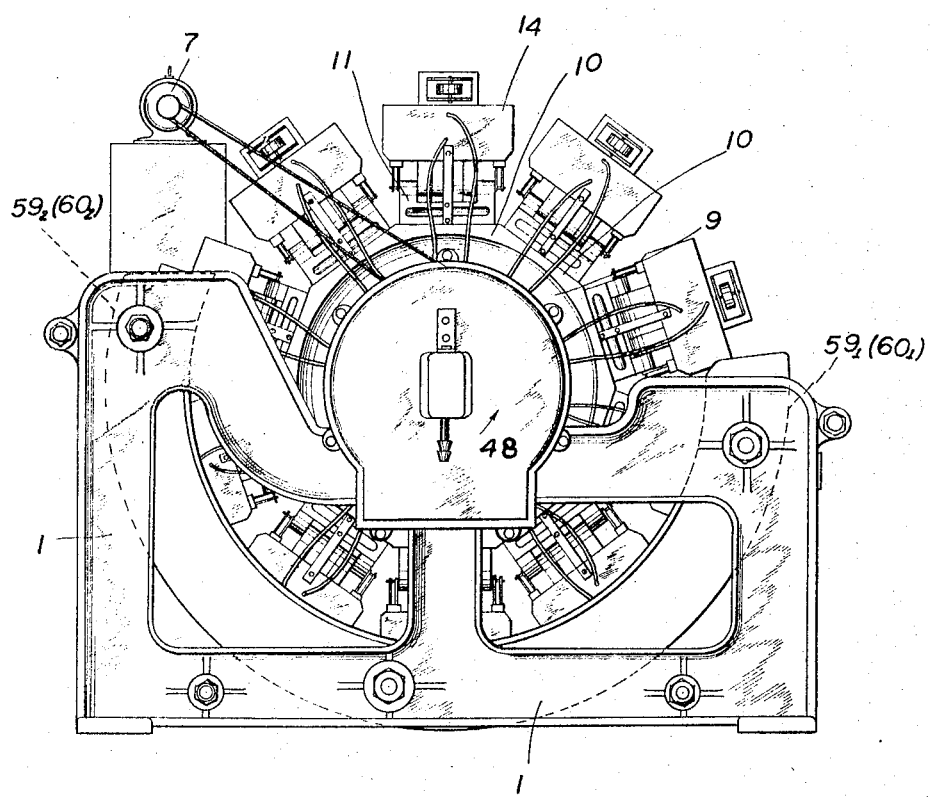
FIG. 3 is a side elevation of an apparatus embodying this invention.

A polygonal rotary disc 9 is fixedly mounted on the shaft 3 at about the middle point between said opposing frames 1 and 2. On each horizontal section 10 (FIG. 3) on the periphery of the rotary disc 9 is secured the lower surface of a bracket 11 for supporting split moulds 14, and a pair of spaced projections 12 and 13 are provided on the upper surface of each supporting bracket 11.

Figure 8:
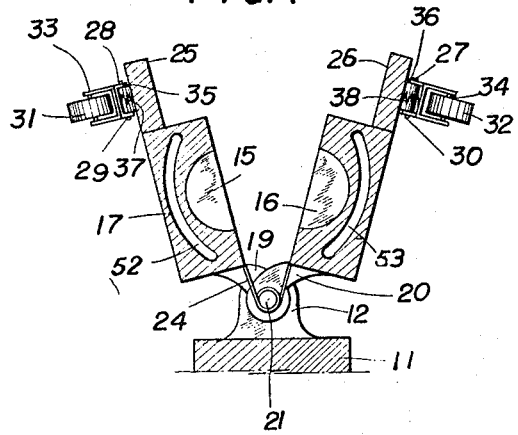
FIG. 8 is a sectional view taken along the line G–G' of FIG. 6.

The split mould 14 including a pair of mould halves 17 and 18 is mounted on each of the brackets 11 with their recesses 15 and 16 facing each other, said mould halves being provided with projections 19 and 20 at their bottom to project toward said shaft 3 between said projections 12 and 13 on the bracket 11. A pin 21 having nuts 22 and 23 at its opposite ends is inserted through projections 12, 13, 19 and 20. The opposite ends of a coil spring 24 wound around the pin 21 engage the lower portion of the left and right hand mould halves 17 and 18 to urge their outer ends to separate. Thus, these mould halves 17 and 18 can swing around the pin 21 between opened and closed positions. Blocks 25 and 26 are secured on the upper surface of the mould halves 17 and 18, respectively, with their outer surface aligned with the outer surface of the associated mould halves. Frame members 33 and 34 having U-shaped cross section and carrying rollers 31 and 32 are respectively pivotally connected at their one end to the outer surface of the blocks 25 and 26 by means of pins 27, 28. It is to be understood that opposite ends of the pins 27 and 28 are caulked to prevent removal thereof. As shown in FIG. 8 coil springs 37 and 38 are respectively interposed between the inner surface of the frame members 33 and 34 and the outer surface of the blocks 25 and 26 to normally urge outwardly the free end of the frame members.

Interchanging of metal moulds 14 can be accomplished by removing nuts 22 or 23 and withdrawing the pin 21 but when the moulds are of relatively large size it is advantageous to bodily interchange the bracket 11 with its associated mould.

As shown in FIG. 5, the left hand portion of the shaft 3 is composed by an inlet tube 41 and an exhaust tube 40 for circulating the cooling water, the right hand end of the tubes 40 and 41 being closed. Also as will be noted from FIG. 5 left hand ends of the inlet and exhaust tubes 40 and 41 are opened respectively at 42 and 43, the opening 43 being located to the right of the opening 42. The opened end 42 of the exhaust tube 40 is surrounded by a cap 44 and a similar cap 45 through which the exhaust tube 40 extends is mounted around the opened end 43 of the inlet tube 41. Although not shown in the drawings suitable water tight seals may be provided between the caps 44, 45 and the tubes 40, 41. These caps 44 and 46 are secured to the cover 48 of said speed reduction device 8 through a metal strap 46. Nipples 47 and 51 are provided for the caps 44 and 45 adapted to be connected to a suitable drain and source of cooling water (not shown) to circulate the cooling water through the inlet and exhaust tubes 41 and 40.

As shown in FIGS. 5 and 8, left and right hand mould halves 17 and 18 are provided with closed interior cavities 52 and 53. An inlet pipe 54 leading from the inlet tube 41 opens into one end of the cavity 52 while an outlet pipe 55 connected to the other end of the cavity 52 opens in the exhaust pipe 40.

In the illustrated embodiment of this invention only the left hand half 17 of the metal mould 14 is shown to be cooled by circulating water so as to cool by conduction the right hand half 18 when the mould is closed. However it is advantageous to cool both mould halves 17 and 18 when moulding a resin requiring long curing time or an article of large size. In such an application the inlet and outlet pipes 54 and 55 may be bifurcated through the use of suitable T connectors and the like (not shown) to circulate the cooling water through both mould halves. Pipes to the right hand mould half may extend through the vertical metal disc 9.

As shown in FIGS. 4 and 5 upright rail supporting plates 56 and 57 are mounted on a base plate 58 between the frames 1 and 2 and on the opposite sides of the rotary disc 9, the upper end of the supporting plates extending to a point near the shaft 3. Semicircular guide rails 59 and 60 are each secured adjacent the inner edge of the supporting plates 56 and 57. These supporting plates are secured to the frames 1 and 2, respectively by bolts 61 and nuts 62 near the lowest portion of the rail.

As shown in FIG. 4 the upper ends of the guide rails 59 and 60 project near the axis of the shaft 3 and these projecting ends are curved at $59_2$ and $60_2$. These rails are designed such that as the rotary disc 9 is rotated, rollers 31 and 32 of the mould halves 17 and 18 which are mounted on said disc will come into contact with the guide rails to urge the metal mould halves 17 and 18 toward closed position, and that as the rollers 31 and 32 disengage from the rails 59 and 60 in the region above the axis of the shaft 3 the mould halves 17 and 18 are biased toward their open position under the tension of said spring 24 wound around the pin 21.

A pair of spaced annular rings 66 and 68 each having annular cavities 65 and 67 are fixed on the right hand portion of the shaft 3 immediately adjacent to the rotary disc 9 and said rings 66 and 68 are connected together by a connecting tube 69 of reduced diameter.

Slidably disposed within cavities 65 and 67 are stationary annular rings 71 and 72 respectively defining therein an annular compressed air supply chamber 74 and an annular air suction or exhaust chamber 75. These rings 71 and 72 are connected by a connecting cylinder 73 of reduced diameter.

A bearing 76 is formed in the connecting cylinder 73 to rotatably support the shaft 3. One end of a supporting tube 77 encircled by the right hand wall of said outer annular ring 68 is connected to the right hand side wall of the air suction ring 72 whereas the opposite end of the tube 77 is connected to the bearing metal 4 mounted on said frame 1 to support rings 71 and 72 stationary with respect to the shaft 3 and the outer rings 66 and 68. Contact surfaces between said outer rings 66 and 68 and inner annular rings 71, 72, between the connecting tube 69 and the connecting cylinder 73 and between the connecting cylinder 73 and the shaft 3 are supplied with a suitable lubricant such as grease, and if required suitable seals may be provided for these contact surfaces in order to prevent the leakage of compressed air or air suction.

As best shown in FIGS. 5 and 8 the right hand portion of the shaft 3 is formed as a cylinder 79 to provide therein an air suction passage 80. A tube 81 for supplying compressed air is disposed in said passage 80. The innermost end of the tube 81 is bent at right angle to communicate with said compressed air supply chamber 74 and a perforation 82 is drilled through the wall of the cylinder 79 to communicate said air suction passage 81 with the air suction chamber 75. The right hand end of the air suction passage 80 is connected to a suitable air suction device (not shown) while the right hand end of the air supply tube 81 to a suitable compressed air supplying device, also not shown in the drawings.

Referring now to FIGS. 1 and 2, the operation of the mould 14 and the compressed air supplying device as well as air suction device associated therewith will be described hereunder.

Figure 6:
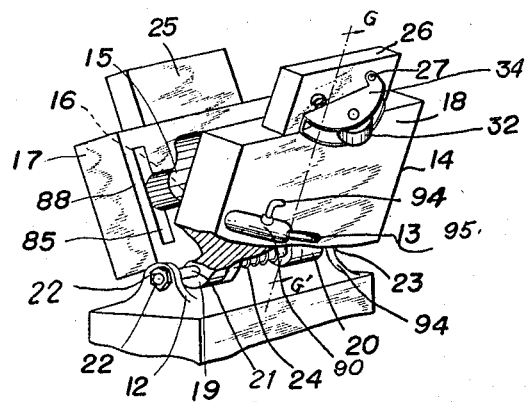
FIG. 6 shows a manner of mounting moulds.

On the opposing inner surfaces of the mould halves 17 and 18 of each mould are provided recesses 15 and 16 of the configuration to form a bottle when the mould halves are closed. The bottom walls 83 and 84 of the recesses 15 and 16 are made thin so that they can easily clamp a section of a tubular blank of suitable resinous material and also to decrease loss of the resinous material. A pair of opposing semicircular recesses 85 and 86 cooperate to form the upper portion of the recesses 15 and 16 or the mouth of the bottle and relatively thin walls 87 and 88 are formed to hermetically seal the recesses 15 and 16 when the mould halves 17 and 18 are closed. An air suction tube 90 is inserted in the recess 85 of the left hand mould half 17 through the side wall thereof. A compressed air supply tube 92 is concentrically disposed in said suction tube 90 with an annular space therebetween and with its inner end 93 slightly projecting beyond the inner end of the tube 90 so as to come into contact with a portion of the wall of the tubular blank 97 made of resinous material when the blank is positioned at the center of the mould 14. The other end of the air supply pipe 92 passes through the wall of the air suction pipe 90 to be supported thereby and a compressed air supply hose 95 (FIG. 6) is connected to the pipe 92. Also an air suction hose 94 is connected to the outer end of the pipe 90. These hoses 94 and 95 are respectively connected to the nearest portion of the outer annular rings 66 and 68 secured to the shaft 3.

Figure 7:
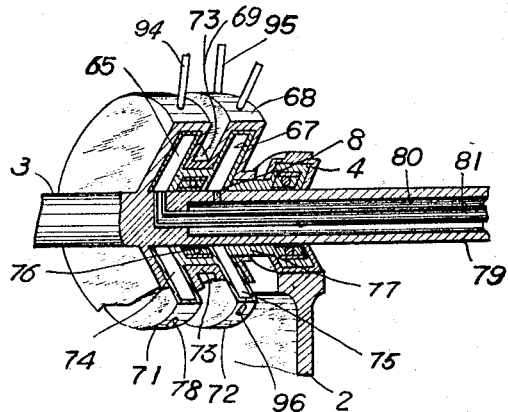
FIG. 7 shows a perspective sectional view taken along the line F–F' of FIG. 5.

A slot 78 of a suitable circumferential length is provided through the periphery of the ring 71 to selectively connect one of the hoses 94 to the compressed air supply chamber 74 and a similar slot 96 is provided for the ring 72 to selectively connect one of the hose 95 to the air suction chamber 77. As best shown in FIG. 7 the angular portions of the slots 78 and 96 are slightly displaced.

When the shaft 3 and the rotary disc 9 are rotated together with moulds 14, until rollers 31 and 32 of the mould halves engage the guide rails 59 and 60, neither the slot 78 of the stationary ring 71 nor the slot 96 of the stationary ring 72 will align with the hose 94 or 95. But when the shaft 3 is further rotated to bring rollers 31 and 32 to engage the side surface of the guide rails 59 and 60 to close the mould as shown by the lower mould of FIG. 5 the slot 96 of the air suction chamber 75 will be communicated with the hose 95, and at a slightly later time the slot 78 of the compressed air supply chamber 74 will be communicated with the hose 94.

In operation, suitably heated and softened tubular blank of resinous material 97 is extruded into an opened mould from an extruding machine (not shown) situated above said mould at a speed corresponding to the peripheral speed of the rotary disc. As the shaft rotates at a low speed the opened mould will be closed by the engagement of its rollers 31 and 32 with the rails 59 and 60. Then the portions of the softened tube clamped by the upper walls 87, 88 and the bottom walls 83, 84 will be fused together to form barries at these portions as shown by FIG. 1(II) to provide a tube section with both ends hermetically sealed. During the interval when the mould halves 17 and 18 are closed, the resilient force afforded by the springs 37 and 38 of the frame members 33 and 34 serves to positively close the mould halves.

Just after closing of the mould, continued rotation of the shaft 3 and the outer rings 66 and 68 will cause the slot 96 of the stationary annular ring 72 to register with a hose 95 leading to said closed mould whereby to exhaust the air in the recesses 85 and 86 within the mould through the tube 90, the hose 95, slot 96, air suction chamber 77, opening 82, and the air passage 80 by means of a suitable evacuating device not shown in the drawings whereby a portion of the wall of the tubular blank 97 positioned in the recesses is attracted toward the inner end of the pipe 90. As will be described later since such portion of the blank positioned in the recesses is to be cut off from the finished moulded article such deformation does not affect the quality of the product.

This state of deformation is indicated by FIGS. 1(III) and 2(III). As can be noted from these figures, the thickness of the wall of the tubular blank is smaller at the point of contact with the inner end of the tube 92 than at the point of contact with the inner end of the outer tube 90. This is because the inner end of the tube 92 projects beyond the inner end of the tube 90. The suction through the tube 90 will draw more material toward the inner end thereof from the point of contact with the inner end of the tube 92. This flow of material will be aided by the plastic flow thereof caused by the engagement with the inner end of the tube 92, and in some instances this end will pierce through the wall of the tubular blank as shown in FIG. 2(IV). In order to assist this piercing when the wall of the tubular blank is relatively thick the inner end of the tube 92 may be pointed.

Continued rotation of the shaft and outer annular rings 66 and 68 will bring the slot 78 of the stationary annular ring 71 to register with the hose 94 leading to the inner tube 92 of the closed mould 14 so as to supply to the interior of the closed tubular blank section 97 compressed air of the pressure sufficient to expand the softened blank material through the pipe 81. Thus the wall of the tubular blank will be pressed against the inner surface of the recesses 15 and 16 as shown in FIG. 1(V). As pointed out hereinabove the space between the blank and the mould is evacuated and the blank material will be moulded into a product having uniform wall thickness. This supply of compressed air is maintained until the closed blank is brought to the lowest position to insure complete moulding.

As the shaft 3 and the outer annular rings 66 and 68 continue rotation communication between the chamber 74 and the hose 94 through the slot 78 and that between the chamber 75 and the hose 95 through the slot 96 will be interrupted to cease supply of compressed air to the mould and evacuation thereof.

The cavity 52 within the left mould half 17 is cooled by cooling water supplied from a suitable source of cooling water and circulates through a path including the nipple 51, tube 41, inlet pipe 54, cavity 52, outlet pipe 55, discharge tube 40 and the nipple 47. As the result as the mould 14 is moved upwardly from its lowest position by the rotation of the shaft the mould is continuously cooled to solidify the product that has been moulded in the mould 14. When the rollers 31 and 33 travel along outwardly curved portions $59_2$ and $60_2$ of the rails 59 and 60 the mould is gradually opened by the spring 24. Although not shown in the drawings a suitable device may be provided adjacent the position where the mould is fully opened to remove therefrom the moulded product which in this embodiment is in the form of a chain of bottles interconnected by tubular sections. Thereafter the bottles are cut from the chain. The top portion of the bottle that has been moulded in the recesses 85 and 86 of the mould is cut off to provide finished product.

Although the above disclosure has been directed to the manufacture of bottles, it will be evident that the principle of this invention may be applied to the manufacture of any hollow moulded articles. For example, for producing cubic hollow articles from a tubular blank, not only a cubic cavity but also a suitable fin shaped recess are provided for the mould to permit evacuation or supply of compressed air through said fin shaped recess.

It is to be observed therefore that according to the present inventive concept, a softened tubular blank of artificial resin is introduced in a mold, the mold is closed, the wall portion of the blank through which compressed air is to be introduced into the hollow blank is made thin or ruptured by the action of air suction, and that products of precise dimension are quickly and continuously produced by the combined action of the compressed air introduced in the blank and air suction applied to the outside of the blank.

While the invention has been explained by describing a particular embodiment thereof, it will be apparent that improvements and modifications may be made without departing from the scope of the invention as defined in the appended claims.

What is claimed is:

1. An apparatus for manufacturing hollow articles from a softened tubular blank of resinous material comprising a rotary disc, a plurality of split moulds mounted on the periphery of said rotary disc, means to sequentially open and close said split moulds, means to feed said softened tubular blank into an opened blank, means to attract a portion of the wall of a section of said tubular blank which is clamped by and enclosed in the closed mould so as to rupture said wall portion, said means including a pair of inner and outer concentric tubes extending from the outside to the inside of the mold, the inner end of the inner tube projecting beyond the inner end of the outer tube, and means to provide air suction to the outer tube and to introduce compressed air into said tubular blank through said inner tube.

2. An apparatus for manufacturing hollow articles from a softened tubular blank of resinous material comprising a rotary shaft, a disc secured to said shaft and including a plurality of split moulds around its periphery, means to open and close said moulds, means to feed said softened tubular blank into an opened mould, each of said mould having an air suction pipe adapted to attract and deform a portion of the wall of a section of said tubular blank which is clamped and enclosed in the closed mould and a compressed air supply pipe adapted to introduce compressed air into said section of said tubular blank through said deformed portion, said air suction pipe and air supply pipe being a pair of inner and outer concentric tubes extending from the outside of the mold to the inside of the mold, the inner end of the inner tube projecting beyond the inner end of the outer tube; and means mounted on said shaft to sequentially connect said air suction pipe and compressed air supply pipe of each mould to a source of air suction and a source of compressed air, respectively.

3. An apparatus for manufacturing hollow articles from a softened tubular blank of resinous material according to claim 2 wherein said last mentioned means comprises a pair of spaced hollow annular rings rotatable with said shaft, one set of hoses between each of said compressed air supply pipes of the respective mould and one of said hollow annular rings, another set of hoses between each of said air suction pipes and the other of said annular rings, a pair of spaced stationary annular hollow rings each adapted to sequentially open and close said sets of hoses and passages provided in said rotary shaft for respectively communicating said stationary hollow rings to a source of air suction and a source of compressed air.

4. The apparatus according to claim 2 wherein each of said split moulds comprises a pair of mould halves pivotally mounted on said disc, and said rotary shaft being hollow so that cooling water is circulated through at least one of said mould halves through said rotary shaft.

5. An apparatus for manufacturing continuously a series of hollow articles from softened tubular blank of resinous material comprising a pair of spaced frames, a horizontal rotary shaft journaled in said frames, a rotary disc mounted on said shaft intermediate of said frames, a plurality of split moulds mounted on the periphery of said rotary disc, a pair of guide rails on the opposite sides of said rotary disc, means to feed said softened tubular blank in an opened mould, means including rollers pivotally connected on the outer side of each of said split moulds to engage said guide rails to close said mould so as to clamp and enclose a section of said tubular blank in said closed mould, means to apply the force of air suction to a portion of the wall of said section to deform or perforate said portion, means to introduce compressed air into said section of the tubular blank to mould it through said deformed portion including a pair of inner and outer concentric tubes extending from the outside to the inside of said molds, the inner end of the inner tube projecting beyond the inner end of the outer tube, and means to open said closed split mould when said rollers disengage from said guide rails.

References Cited by the Examiner

UNITED STATES PATENTS

| | | | |
|---|---|---|---|
| 2,579,399 | 12/1951 | Ruekberg | 264—98 X |
| 2,959,812 | 11/1960 | Allen | 264—98 X |

FOREIGN PATENTS 591,405  4/1959  Italy.

ROBERT F. WHITE, *Primary Examiner.*

A. R. NOE, *Assistant Examiner.*